(12) United States Patent
Mienhardt et al.

(10) Patent No.: US 10,843,296 B2
(45) Date of Patent: Nov. 24, 2020

(54) CUTTING A WORKPIECE

(71) Applicant: TRUMPF Werkzeugmaschinen GmbH + Co. KG, Ditzingen (DE)

(72) Inventors: Uwe Mienhardt, Korntal-Münchingen (DE); Martin Spiess, Gerlingen (DE); Guido Schoenhardt, Ditzingen (DE); Michael Krutzke, Sindelfingen (DE); Dennis Wolf, Rutesheim (DE); Carsten Krenz, Leinfelden-Echterdingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 16/387,848

(22) Filed: Apr. 18, 2019

(65) Prior Publication Data

US 2019/0247960 A1 Aug. 15, 2019

Related U.S. Application Data

(63) Continuation of application No. PCT/EP2017/076426, filed on Oct. 17, 2017.

(30) Foreign Application Priority Data

Oct. 19, 2016 (DE) .................. 10 2016 220 459

(51) Int. Cl.
*B23K 26/38* (2014.01)
*B23K 26/142* (2014.01)
(Continued)

(52) U.S. Cl.
CPC ............ *B23K 26/38* (2013.01); *B23K 26/032* (2013.01); *B23K 26/0622* (2015.10);
(Continued)

(58) Field of Classification Search
CPC .. B23K 26/38; B23K 26/032; B23K 26/0622; B23K 26/142; B23K 26/126; G01N 21/8851
See application file for complete search history.

(56) References Cited

U.S. PATENT DOCUMENTS 5,373,135 A * 12/1994 Beyer .................. B23K 26/032
219/121.62
8,714,066 B2  5/2014 Wahl
(Continued)

FOREIGN PATENT DOCUMENTS

CN    101821065 A    9/2010
CN    101896308 A    11/2010
(Continued)

OTHER PUBLICATIONS

The International Preliminary Report on Patentability for International Application No. PCT/EP2017/076426 dated May 2, 2019.
(Continued)

*Primary Examiner* — Anita K Alanko
(74) *Attorney, Agent, or Firm* — Fish & Richardson P.C.

(57) ABSTRACT

A method for cutting a workpiece includes cutting the workpiece along a predefined cutting contour to separate a workpiece part from a scrap part, and checking whether the workpiece part has been fully separated from the scrap part during the cutting. The workpiece is re-cut along an additional cutting contour laterally offset from the predefined cutting contour if it is found during the checking that the workpiece part has not been fully separated from the scrap part. The disclosure also relates to an associated machine for cutting a workpiece.

15 Claims, 3 Drawing Sheets

(51) Int. Cl.
    *B23K 26/03*         (2006.01)
    *G01N 21/88*        (2006.01)
    *B23K 26/0622*    (2014.01)
    *B23K 26/12*         (2014.01)

(52) U.S. Cl.
    CPC ....... *B23K 26/142* (2015.10); *G01N 21/8851* (2013.01); *B23K 26/126* (2013.01)

(56) References Cited

U.S. PATENT DOCUMENTS

| | | | |
|---|---|---|---|
| 8,941,029 B2 | 1/2015 | Hofmann | |
| 9,452,544 B2 | 9/2016 | Hagenlocher et al. | |
| 9,457,427 B2 | 10/2016 | Hesse et al. | |
| 9,501,821 B2 | 11/2016 | Pfitzner et al. | |
| 10,155,287 B2 * | 12/2018 | Spiess | B23K 26/048 |
| 2009/0127239 A1 * | 5/2009 | Numata | B23K 26/40 |
| | | | 219/121.71 |
| 2011/0108531 A1 * | 5/2011 | Stokes | B23K 26/364 |
| | | | 219/121.69 |
| 2011/0210109 A1 * | 9/2011 | Szelagowski | B23K 26/1476 |
| | | | 219/121.72 |
| 2012/0160818 A1 * | 6/2012 | Miyazaki | B23K 26/18 |
| | | | 219/121.72 |
| 2013/0327194 A1 * | 12/2013 | Hagenlocher | B23K 26/032 |
| | | | 83/13 |
| 2018/0111230 A1 * | 4/2018 | Imaya | B23K 26/16 |

FOREIGN PATENT DOCUMENTS

| | | |
|---|---|---|
| CN | 103857490 A | 6/2014 |
| CN | 104107982 A | 10/2014 |
| CN | 104174990 A | 12/2014 |
| DE | 102009049750 | 4/2011 |
| DE | 102010039525 | 2/2012 |
| DE | 102011004117 | 8/2012 |
| EP | 3 075 485 | 10/2016 |
| WO | WO 2015/080179 | 6/2015 |

OTHER PUBLICATIONS

The International Search Report for International Application No. PCT/EP2017/076426 dated May 28, 2018.
The German Office Action for German Application No. DE 10 2016 220 459.9 dated Jul. 13, 2017.
CN Office Action in Chinese Appln. No. 201780065042, dated Aug. 11, 2020, 17 pages (with English translation).
CN Search Report in Chinese Appln. No. 201780065042, dated Aug. 5, 2020, 2 pages.

* cited by examiner

CUTTING A WORKPIECE

CROSS REFERENCE TO RELATED APPLICATIONS

This application is a continuation of and claims priority under 35 U.S.C. § 120 from PCT Application No. PCT/EP2017/076426, filed on Oct. 17, 2017, which claims priority from German Application No. 10 2016 220 459.9, filed on Oct. 19, 2016. The entire contents of each of these priority applications are incorporated herein by reference.

TECHNICAL FIELD

The present invention relates to a method for cutting a plate-like workpiece, for example, a metal sheet.

BACKGROUND

Plate-like workpieces, e.g. metal sheets, can be cut by means of thermal or by means of mechanical machining. In thermal machining by means of a machining beam, for example by means of a laser beam, a workpiece part is fully separated from a scrap part along a cutting contour. The scrap part may be a scrap workpiece or a scrap skeleton of the workpiece from which the workpiece part (useful part) is cut free. Alternatively, the cut-free part may be a scrap part (waste), for example a cutting slug, that may be cut free from a useful part. The cutting contour used for the cutting off can be a closed cutting contour, although this is not strictly necessary. If, for example, an edge of the part to be separated forms an outer edge of the workpiece, the part can be cut free from the scrap skeleton without cutting a closed cutting contour.

In cutting, in particular in laser cutting, it is possible that workpiece parts and/or scrap parts are not fully separated from the scrap skeleton or scrap workpiece due to parameter and/or process errors and so do not fall down out of the scrap workpiece or out of the workpiece plane, thereby creating an interrupted contour for the further processing. Interference contours that do not fall, e.g. caused by slugs, are critical throughout the entire machining process, in particular on a machine having shaft elements or support carriages that are carried along. Machine elements, in particular carried-along machine elements, can be damaged by slugs or useful parts located in part beneath the workpiece plane. The workpiece can also be moved or raised accidentally due to an interlocking fit, such that the contour precision is no longer provided. As a result, a poor cut or a failed cut may be produced in some cases, or, due to a sufficient frictional fit with the carried-along machine elements, the workpiece may be torn away from the clamping elements on which the workpiece is typically mounted during the cutting.

WO 2015/080179 A1 solves the problem of removing a large scrap part or discarded part when cutting a hole into a workpiece by introducing a plurality of cutting lines in the workpiece in the region of the hole to be cut so as to cut the large scrap part up into a plurality of small scrap parts. The hole is subsequently cut along the contour line starting from the scrap part that is intended to fall down last in the direction of the profile line of the hole.

DE 10 2009 049 750 A1 describes a method for cutting material along a desired cutting track by applying a plurality of laser pulses of a modulated laser beam. In one example, the modulated laser beam repeatedly travels over the cutting track, wherein at least one cutting parameter is changed between two runs. In this way, first laser cutting points made in the workpiece during a first run over the cutting track can be offset from second laser cutting points made in the workpiece during a second run over the cutting track.

DE 10 2011 004 117 A1 describes a method for monitoring cutting of a workpiece for separating a workpiece part from a scrap workpiece along a desired cutting contour. In this case, an automated check is carried out after the cutting as to whether a workpiece part has been fully cut free from the scrap workpiece.

SUMMARY

The present invention relates to a method of cutting a workpiece that includes cutting the workpiece along a predefined cutting contour to separate a workpiece part from a scrap part, and checking whether the workpiece part has been fully separated from the scrap part during the cutting. The invention also relates to a machine for cutting a workpiece, comprising: a machining head for directing a machining beam to the workpiece, at least one movement device for generating a relative movement between the machining head and the workpiece, a control device for controlling the at least one movement device to separate a workpiece part from a scrap part by cutting the workpiece along a predefined cutting contour, and an evaluation device designed to check whether the workpiece part has been fully separated from the scrap part during the cutting.

One object addressed by an aspect of the invention is that of providing a method and a workpiece cutting machine that allow for automated elimination of interference contours that occur when a workpiece part has not been fully separated from a scrap part. An object addressed by another aspect of the invention is that of providing a workpiece cutting method and machine in which the check as to whether a workpiece part has been fully separated from the scrap workpiece can be carried out with a high degree of robustness.

According to a first aspect, this problem is solved by a method of the type mentioned at the outset, characterized by: re-cutting the workpiece along an additional cutting contour laterally offset from the predefined cutting contour if it is found during the previous check that the workpiece part has not been fully separated from the scrap part. The additional cutting contour extends at least along a portion or region of the predefined cutting contour and in particular can extend along the entire predefined cutting contour. The additional cutting contour is typically offset in parallel from the predefined cutting contour by a constant amount; optionally, the amount by which the additional cutting contour is offset from the predefined cutting contour can vary along the additional cutting contour. The cutting along the cutting contour is carried out by means of a machining beam, generally a laser beam, although a different type of machining beam, for example a plasma beam or a water jet, can also be used for this purpose.

In the method according to the invention, using a suitable sensor system or a suitable detector, a check is first carried out as to whether reworking is required following the cutting in order to fully separate the workpiece part from the scrap part. If this is the case, cutting is carried out again along the cutting contour, and specifically along an additional cutting contour laterally offset from the predefined cutting contour so as to thus fully separate the workpiece part (useful part) from the scrap part (waste) and thereby prevent the useful part or scrap part that has not been fully cut free forming an interference contour for the further cutting of the workpiece. The lateral offset is advantageous since if the re-cutting was carried out along the predefined cutting contour, i.e. without a lateral offset, damage to the edge of the useful part is likely due to the edge region of the machining beam and/or due the scrap part moving within the cutting contour that forms the cutting gap, said damage being caused by the gas pressure of the process gas.

In an advantageous variant, the additional cutting contour is offset laterally towards the scrap part (waste), i.e. the distance from the useful part is increased. If the magnitude of the lateral offset is selected appropriately, it is possible to prevent the circumferential edge of the workpiece part (useful part) being damaged during the re-cutting as a result of the machining beam or of dross formed during the re-cutting, or to prevent the circumferential edge of the useful part being welded or rounded.

In a variant, the additional cutting contour is laterally offset by an amount that is so large that a machining beam directed to the workpiece for cutting the workpiece along the additional cutting contour impinges on a circumferential edge of the workpiece part at an intensity that is less than 50%, preferably less than 30%, in particular less than 20%, of a maximum intensity of the machining beam. Across its beam cross section, a machining beam, e.g. in the form of a laser beam, generally has an intensity distribution that decreases towards the edge from a maximum intensity, which is typically present at least in the centre of the beam cross section. Whilst the maximum intensity is sufficient for fusing the workpiece for the cutting, this is typically not the case for the intensities occurring in the edge region of the laser beam, and so the machining beam, in particular the laser beam, can no longer damage the circumferential edge of the workpiece part.

In a development, the additional cutting contour is laterally offset from the predefined cutting contour by an amount that is at least 2%, preferably at least 5% of the cutting gap width of the predefined cutting contour. Using a lateral offset of this kind, it can generally be ensured that the machining beam and/or dross formed during the re-cutting does/do not damage the circumferential edge of the workpiece part.

In a further variant, the additional cutting contour is laterally offset from the predefined cutting contour by an amount that is smaller than a cutting gap width of the predefined cutting contour. If the process gas pressure used during the cutting is kept constant, i.e. also for the re-cutting, only a certain measure of the amount of the offset from the predefined cutting contour is typically reliable. If the additional cutting contour is offset by a distance or an amount that corresponds to the cutting gap width of the predefined cutting contour, the doubling of the cutting gap width produced in this way can cause interference with the cutting quality as far as to process breakdown or miscutting, and so the cutting gap width of the predefined cutting contour forms an upper limit for the amount of the offset of the predefined cutting contour. In addition, as the amount of the lateral offset approaches the width of the cutting contour or the cutting gap during the re-cutting, it is likely that more and more dross will be released, which can reach the circumferential edge of the workpiece part and settle there.

In a variant, the laterally offset cutting contour is traced in the opposite machining direction to the predefined cutting contour during the re-cutting.

In a further variant, the laterally offset cutting contour formed during the re-cutting only extends along a portion of the predefined cutting contour.

In principle, there are several options for reworking or re-cutting along the laterally offset cutting contour: the predefined cutting contour can be machined again either fully or partly, i.e. along one section or portion, using the same and/or different cutting parameters (e.g. maximum laser power, advance rate, process gas pressure, etc.), in which case the laterally offset cutting contour can be traced in the same machining direction as the predefined cutting contour or in the opposite machining direction to the predefined cutting contour. In this case, the additional cutting contour can be cut either partly or fully with an overlap to the start of the predefined cutting contour.

In another aspect of the invention or in another variant, the predefined cutting contour or an additional contour laterally offset from the predefined cutting contour is retraced using a cutting-gas beam if it is found during the check that the workpiece part has not been fully separated from the scrap part. In this aspect of the invention or in this variant, the workpiece is not cut again, but instead the cutting contour or optionally a laterally offset additional contour is retraced using a cutting-gas beam. A machining beam used for the cutting is switched off when the cutting contour is being retraced by the cutting-gas beam. Using the cutting-gas beam, slightly stuck workpiece parts can be made to fall in a quality-neutral manner, i.e. without influencing the edges of the scrap part or workpiece part, and expelled downwards out of the workpiece plane. The effectiveness of cutting using the machining beam is greater than the effectiveness when using the cutting-gas beam, and so re-cutting can be carried out after the cutting contour or the laterally offset contour has been retraced. The course of the additional contour corresponds to the course of the above-described additional cutting contour. In particular, the cutting contour or the additional contour may be retraced by the cutting-gas beam only in part, i.e. along a section or portion.

In a further aspect of the invention or in a further variant, the check as to whether the workpiece part has been separated from the scrap part comprises the following steps: irradiating the workpiece with a preferably pulsed machining beam at a check position within the predefined cutting contour, detecting radiation generated by interaction between the machining beam and the workpiece, and evaluating the detected radiation to check whether the workpiece part has been fully separated from the scrap part during the cutting, wherein, during the irradiation with the machining beam, the intensity of the machining beam at the check position is increased, and the irradiation with the machining beam is stopped as soon as it is found during the check that the workpiece part has not been fully separated from the scrap part during the cutting. The machining beam used for the check can in particular be a laser beam. The manner of carrying out the check as to whether the workpiece part has been separated from the scrap part substantially corresponds to the method described in document DE 10 2011 004 117 A1 cited at the outset, which is incorporated into the content of this application by reference.

The pulsed machining beam that irradiates the workpiece can be a single pulse of the machining beam, in particular a laser pulse, or a plurality of laser pulses. The machining beam is typically generated by the same beam source that also generates the machining beam for cutting the workpiece. Optionally, a machining beam generated by a different beam source, for example from a pilot laser or the like, can be used for the check.

If the cut part (workpiece part or scrap part) may potentially form an interference contour, during the check or the checking step a check as to whether the workpiece part has been fully separated from the scrap part is typically carried out immediately following the cutting along the cutting contour. In principle, all parts formed or cut free during the cutting may form a potential interference contour for the subsequent cutting.

For the check, the workpiece part is irradiated with the machining beam at a check position within the predefined cutting contour, more specifically within the cut-free part (workpiece part or scrap part), so as to detect whether the workpiece part has been fully separated from the scrap part on the basis of radiation possibly generated during the interaction. If the workpiece part has been fully separated from the scrap part, the scrap part is typically expelled downwards out of the workpiece plane, i.e. the machining beam that irradiates the workpiece at the check position radiates into the void at a hole formed within the cutting contour, and so practically no interaction occurs between the machining beam and the workpiece and no radiation intensity or extremely low radiation intensity is detected.

As set out above, the check as to whether the workpiece part has been separated from the scrap part is carried out substantially in the manner described in document DE 10 2011 004 117 A1 cited at the outset, i.e. without increasing the intensity of the machining beam at the check position and without stopping the irradiation with the machining beam as soon as it is found during the check that the workpiece part has not been fully separated from the scrap part during the cutting. If a fixed machining beam power is used during the check throughout the check duration, it is generally necessary to carry out complex determination of characteristics for the workpiece materials, workpiece thickness, etc. machined in each case, and maintenance of these characteristics in tables or databases. Despite this relatively complex data determination, in certain cases when a fixed machining beam power is used, particularly high levels of robustness cannot be reached in the checking process, as will be described in more detail below.

The inventors have found that, among other things, depending on the divergence of the machining beam and the position of the workpiece part relative to the scrap part, in unfavourable cases the material of the workpiece part is merely heated during irradiation with the machining beam, without the interaction between the machining beam and the workpiece part generating sufficient radiation to be detected. An unfavourable case of this kind may occur in particular when the workpiece part sinks several millimetres down in relation to the scrap part, despite still being connected thereto. In an unfavourable case of this kind, if too low a machining beam power is used during the check, it may potentially be concluded that the workpiece part has been fully separated from the scrap part despite this not actually being the case, as a result of which components of the machining machine and the workpiece part may subsequently collide.

If too high a machining beam intensity is used at the check position, however, the workpiece may be marked by the machining beam and the machining beam may possibly pierce the workpiece part. Since at least one re-cutting is optionally carried out, in particular in a manner laterally offset from the cutting contour (see above), in order to fully separate the workpiece part from the scrap part, it is generally necessary to carry out the check several times on the same workpiece part. If the machining beam pierces the workpiece part, a repeated check at the same check position may possibly lead to an undesired result, since no more radiation generated during the interaction can be measured at the pierced site even though the workpiece part is still present. The presence of the workpiece part is not detected in this case either, and there is a risk of collision in subsequent processes. Even if the workpiece part is not fully pierced, too high a machining beam power can burn a crater into the workpiece part; this is accompanied by very high levels of sparking. The sparks can soil the machine, for example in the form of spatter marks on a protective glass attached to the machining head.

In the aspect of the invention being described here, or in the variant being described here, during irradiation with the machining beam, the intensity of the machining beam at the check position is increased, and the irradiation with the machining beam is stopped as soon as it is found during the check that the workpiece part has not been fully separated from the scrap part during the cutting. In this way, the machining beam can sufficiently interact with the workpiece during the irradiation, and thus it can be reliably determined that a workpiece part has not been fully separated from the scrap part. Additionally, as soon as it is detected that the workpiece part has not been fully separated from the scrap part, the irradiation is stopped so as to prevent crater formation or piercing of the workpiece.

In this way, if the distance of the workpiece part from the focus position of the machining beam or scrap part is unknown, the presence of the workpiece part can be reliably detected. The value range between the minimum intensity of the machining beam at the check position and the maximum intensity of the machining beam at the check position in the event that the radiation is not stopped covers a value range that is practical for detecting the workpiece part. The stopping of the irradiation with the machining beam at the check position can in particular be performed in real time or by means of a real-time interface that practically instantaneously switches off the beam source used to generate the machining beam.

In a variant of the method, the power of the machining beam is increased, in particular in steps, during irradiation at the check position. To increase the intensity of the machining beam at the check position, a particularly simple option is to increase the power of the machining beam. In this case, at the beginning of the irradiation or at the beginning of the check, the workpiece is irradiated with the machining beam at a power that is below the maximum possible power of the beam source and the power is increased continuously (i.e. in the manner of a power ramp) or in steps. If no radiation generated during the interaction is detected throughout the check, the power of the beam source can be increased during the check duration up to a maximum possible power, for example. If the presence of the workpiece part is detected during the check duration, the irradiation with the machining beam is interrupted practically in real time, i.e. the time portion of the check duration containing the remaining power ramp or the remaining steps is no longer carried out.

In a development, the check position is irradiated with the machining beam in a pulsed manner and the power of the pulses of the machining beam is increased in steps. In this case, for example, the power of the machining beam can be increased (in steps) using a fixed temporal cycle or after a time period fixed in each case. The power of the pulses, which is increased in steps, can be the average power of the pulses, but can also be a different measure for the power of the pulses, for example the peak power (maximum power). The specified temporal cycle can, for example, be in the order of a few milliseconds.

In a development of this variant, the power of the pulses is at least doubled each time during the stepped increase. By doubling the power, or possibly increasing it even more, during two successive pulses or steps, the number of pulses required to cover a comparably large value range of the machining beam power can be kept low. For example, if e.g. five pulses or steps are used, each having a constant duration, a value range between approximately 100 W in the first step and 1600 W in the fifth step can be covered.

In a further variant, the intensity of the machining beam at the check position is increased by shifting the focus position of the machining beam towards the workpiece. In this case, the power of the machining beam is generally kept constant during the check duration, although this is not strictly necessary. At the start of the check duration or check interval, the focus position is selected so as to be spaced apart from the workpiece in the beam direction of the machining beam, and the focus position of the machining beam is shifted towards the workpiece during the check duration. At the end of the check duration, the machining beam can be shifted to the top face of the workpiece; however, it is also possible for the focus position to be positioned at a defined distance below the top face of the workpiece, for example at the height of the underside of the workpiece.

The smaller the distance between the focus position and the workpiece part, the smaller the diameter of the machining beam on the workpiece part and the greater the intensity of the machining beam on the workpiece part. As described above in relation to increasing the power of the machining beam, the focus position can also be shifted, and thus the intensity of the machining beam at the check position increased, either continuously or in steps. To change the focus position, the distance between a focusing device and the workpiece can be changed. To do so, the distance between a machining head, in which the focusing device is arranged, and the workpiece can be changed for example, in particular reduced.

In a variant, to check whether the workpiece part has been fully separated from the scrap part during the cutting, the intensity of the detected radiation is compared with an intensity threshold value and the irradiation with the machining beam is stopped as soon as the intensity threshold value is exceeded. By means of the above-described detector, the radiation generated during the interaction, which may for example have wavelengths in the infrared wavelength range, is detected. When the intensity threshold value is exceeded, the presence of the workpiece part in the scrap part is detected and the beam source is switched off, ideally in real time. As described above, this can effectively prevent craters being formed on the material or prevent the material of the workpiece part being pierced by the machining beam.

If it is found when evaluating the detected radiation that the workpiece part has not been fully separated from the scrap part during the cutting, re-cutting can be carried out immediately afterwards. Alternatively, a subsequent check can be carried out first and the checking step repeated by irradiating the workpiece with the machining beam again, typically at a different check position, and evaluating the radiation generated in the process. Re-cutting is only carried out if the subsequent check also shows that the workpiece part has not been fully separated from the scrap part.

It goes without saying that if the check shows that the workpiece part has been fully separated from the scrap part, the cutting of the workpiece is resumed.

In a development, a check position within the predefined cutting contour that is spaced apart from the predefined cutting contour and/or from a starting contour by at least the cutting gap width of the cutting contour is irradiated with the machining beam. The check position should be at a minimum distance from the cutting contour so that the machining beam is not accidentally radiated wholly or partly into the region of the cutting contour during the check, which would falsify the result of the check. If the cut-free part is a scrap part, a starting contour typically also extends in said part, said contour starting from a piercing position being required for starting the cutting process. During the check, a minimum distance from the starting contour should be maintained to prevent the check result being falsified. In addition, the check position should be as close to the cutting end as possible, i.e. as close as possible to the cutting-free position, so that the distance between the cutting-free position and the check position is as small as possible and the check can be carried out as quickly as possible. The minimum distance can also be selected to be greater than the cutting gap width, for example if the machining beam has a so-called pulse action radius in which the machining beam influences the material of the workpiece outside the beam diameter, e.g. in that the machining beam leads to warping of workpiece material at that site. In this case, the minimum distance should correspond at least to the sum of the cutting gap width and the pulse action radius.

In a further aspect of the invention or a further variant of the above-described method, in which the check as to whether the workpiece part has been fully separated from the scrap workpiece comprises irradiating the workpiece with a machining beam at a check position within the predefined cutting contour, if it is found during the check that the workpiece part has not been fully separated from the scrap part during the cutting, at least one gas pulse is applied to the check position, or optionally to any other position within the cutting contour, in order to discharge the workpiece part from a bearing plane. Typically, the gas pulse is applied to the check position by a cutting-gas nozzle of the machining head, by which the machining beam is also directed to the workpiece. However, it is also possible for one or more gas pulses generated by a lateral gas nozzle to be applied to the check position obliquely. The duration of the gas pulse may be in the order of seconds, e.g. two seconds, and have a high gas pressure of e.g. more than approximately 10 bar or 15 bar. The gas used for generating the gas pulse can in particular be an inert gas, e.g. nitrogen. "Blowing out" the workpiece part using the gas pulse(s) is quality-neutral, i.e. the edges of the workpiece part or of the scrap workpiece are not influenced, but "blowing out" is generally less effective than re-cutting using the machining beam. Once the gas pulse(s) has/have been applied to the check position, another check as to whether the workpiece part has been removed from the bearing plane can be carried out at the same check position. Optionally, the at least one gas pulse can be applied to a different check position within the cutting contour, in particular if the likelihood of the workpiece part being expelled when the gas pulse is applied to said position is greater than when the gas pulse is applied to the check position.

In a further variant, the method additionally comprises: (re)checking whether the workpiece part has been fully separated from the scrap part during the re-cutting. After the reworking or after the re-cutting, in this case a new check is carried out as to whether the workpiece part has been fully separated from the scrap workpiece. If the new check is carried out by irradiating the workpiece with the machining beam, the new check can be carried out at the same check position as in the previous check, but the new check can also be carried out at a different check position. The latter case is advantageous in particular when the machining beam influences the workpiece, for example when said beam causes warping of the workpiece material. In this case, the distance between the two check positions should correspond at least to the cutting gap width and optionally also to the pulse action radius. If it is found during the new check that the workpiece part has still not been separated from the scrap workpiece, an additional reworking step can be carried out, i.e. additional cutting using a laterally offset cutting contour, followed by an additional checking step, etc.

To prevent an infinite loop, in the above-described case an adjustable tolerance threshold value can be specified, corresponding to a defined number of repetitions of (re)cutting steps. If the tolerance threshold value is exceeded, the machine is switched over into a pause mode, i.e. the cutting of the workpiece is suspended. Additionally or alternatively, additional actions can be carried out, e.g. an acoustic warning and/or a message and/or a real-time image of the machining space of the machine and/or a notification to a communications instrument of a machine operator. The additional action(s) can be implemented upon reaching the first repetition stage, the final repetition stage, i.e. when the tolerance threshold value has been exceeded, or any repetition stage therebetween.

Alternatively or additionally to the above-described check in which the workpiece is irradiated with a machining beam, the check as to whether the cut-free part has fallen down out of the workpiece plane can also be carried out by means of a photoelectric sensor, a light grid or the like that is arranged below the workpiece plane and detects the cut-free part falling down.

In a further variant, a cutting-gas stream containing a first cutting gas, preferably a reactive gas, for example oxygen, is made to flow onto the workpiece during the cutting, and a cutting-gas stream containing a second cutting gas different from the first cutting gas, preferably an inert cutting gas, in particular nitrogen, is made to flow onto the workpiece during the re-cutting. It has proven advantageous to use an inert gas during the re-cutting since the gas pressure in this case can generally be selected to be greater than in the case of a reactive gas. In addition, using an inert gas does not lead to the risk of a thermal reaction with the workpiece material.

In a further variant, a distance between a machining head and the workpiece is increased during the re-cutting. It has proven advantageous to increase the distance between the machining head, in particular a cutting-gas nozzle provided thereon, and the workpiece during the re-cutting, since this can increase the robustness of the cutting. Increasing the distance is expedient in particular in cutting processes in which the cutting distance between the machining head and the workpiece is low, as for example in the case of cutting processes having a bypass flow nozzle in which the cutting distance may be just 0.4 mm. By contrast, the distance between the machining head or cutting-gas nozzle and the workpiece during the re-cutting can be selected to be comparably large and, for example, to be around 3 mm.

In a development, as the distance is increased, the focus position of the machining beam is shifted towards the workpiece in order to use the same focus position during the re-cutting as during the cutting. For this purpose, the focus position is typically shifted towards the workpiece by a length that corresponds to the length by which the distance between the machining head and the workpiece is increased. By maintaining the focus position, it is possible during the re-cutting to generate a cutting gap of which the width substantially corresponds to the width of the cutting gap during the cutting. To shift the focus position towards the workpiece without changing the distance between the machining head and the workpiece, a focusing device, for example a focusing lens, arranged in the machining head can for example be shifted relative to a housing of the machining head.

A further aspect of the invention relates to a workpiece cutting machine of the type mentioned at the outset, in which the control device is designed or programmed to control the at least one movement device to re-cut the workpiece using an additional cutting contour laterally offset from the predefined cutting contour if the evaluation device finds during the check that the workpiece part has not been fully separated from the scrap part. The movement device controlled by the control device can be a movement device for moving the machining head, which is typically a laser cutting head. Alternatively or additionally, the control device can control a movement device that is designed to move the workpiece. A relative movement between the machining head and the workpiece should be understood as being a movement in or parallel to a plane in which the typically plate-shaped workpiece is arranged. The lateral offset between the predefined cutting contour and the additional, laterally offset cutting contour is produced in the workpiece plane.

In a further aspect of the invention or in an additional embodiment, the machine comprises a detector for detecting radiation that is generated by interaction between the machining beam and the workpiece and produced when the workpiece is irradiated with the preferably pulsed machining beam at a check position within the predefined cutting contour, wherein the evaluation device is designed to check whether the workpiece part has been fully separated from the scrap part on the basis of the detected radiation, and wherein the control device is designed to increase the intensity of the machining beam at the check position and to stop the irradiation with machining beam at the check position as soon as it is found during the check that the workpiece part has not been fully separated from the scrap part during the cutting. As described above in relation to the method, in the machine, too, a reliable check can be carried out as to whether the workpiece part has been fully separated from the scrap part, even if the exact position of the workpiece part relative to the scrap part or focus position of the machining beam is unknown.

The control device is designed to execute an NC (numerical control) machining program, in which the cutting contours of the parts to be cut are predefined for a workpiece to be cut. In this case, the cutting contours are cut by means of the control device communicating with other components of the machine, for example with the beam source, the distance controller between the machining head and the workpiece, the control panel (human-machine interface, HMI) and the programmable logic controller (PLC), with specified cutting parameters for each predefined cutting contour. After the part or cutting contour has been cut, a waiting period can be provided in the NC machining program to allow the workpiece to cool down before an additional part is cut. The above-described check can be carried out in particular during this waiting period, which may be scheduled anyway.

In the simplest case, the detector can be a photodiode that records or measures the intensity of the radiation reflected from the workpiece, typically process radiation, thermal radiation and/or reflected or scattered machining radiation, in particular laser radiation, generated during the interaction of the machining beam with the workpiece. The detector, e.g. in the form of a photodiode, can for example be arranged in the beam source for generating the machining beam, for example a solid-state laser for generating a laser beam. In particular, detecting laser radiation reflected from the workpiece has proven advantageous since in this case the machining beam can be irradiated at a power that is considerably lower than the detection of the process luminescence or thermal radiation, meaning that the cut-free part is not damaged during the check. The latter case is advantageous in particular if the cut-free part is a useful part.

In one embodiment, the machine comprises a beam source and the control device is designed or programmed to control the beam source to increase the power of the machining beam, in particular in steps, during irradiation of the check position. As described above in relation to the method, changing the power of the beam source can very quickly increase the intensity of the machining beam at the check position either continuously or in steps, and so the check duration need not be extended, or may only need extending slightly, compared with a check using a constant power.

In a further embodiment, the control device is designed to control the beam source to irradiate the check position with the machining beam in a pulsed manner and to increase the power of the pulses of the pulsed machining beam in steps, wherein preferably the power of the pulses is at least doubled each time during the stepped increase. When the power is doubled, a comparably small number of steps is required to cover a large value range of the laser beam power, as a result of which the check duration can be shortened while using the same pulse duration. Instead of a stepped increase, the machining beam power can also be increased continuously, in particular when using a continuous-wave (CW) machining beam.

In a further embodiment, the machine further comprises a focusing device arranged in the machining head, and an additional movement device for moving the machining head in a direction perpendicular to the workpiece, and, in order to increase the intensity of the machining beam at the check position, the control device is designed to control the additional movement device to shift the focus position of the machining beam towards the workpiece during irradiation of check position with the machining beam. The smaller the distance between the focus position of the machining beam and the workpiece, the smaller the diameter of the machining beam on the workpiece and the greater the intensity of the machining beam at the check position. To increase the intensity of the machining beam at the check position, therefore, the distance between the focus position and the workpiece or workpiece part can be reduced continuously or optionally in steps. Instead of shifting the machining head, the focus position can optionally also be adjusted in another manner, for example by shifting the focusing device relative to the machining head.

In a further embodiment, in order to check whether the workpiece part has been fully separated from the scrap part during the cutting, the evaluation device is designed to compare the intensity of the detected radiation with an intensity threshold value. As described above, in the simplest case the intensity of the detected radiation can be compared with an intensity threshold value, in particular when a non-position-sensitive detector such as a photodiode is used. If the intensity drops below the intensity threshold value, there is no workpiece material at the check position and the NC cutting program is continued in order to cut an additional workpiece part. If the value of the intensity of the detected radiation is above the intensity threshold value, it is assumed that interfering workpiece material is present at the check position and thus that the workpiece part has not been fully separated from the scrap part. In this case, the irradiation of the check position with the machining beam is stopped ideally in real time, as described in more detail above.

If a position-sensitive detector is used for the check, instead of the comparison with an intensity threshold value, the detected radiation can be evaluated by means of an image recognition method carried out on an image of the workpiece taken, for example, through a machining nozzle of the machining head. The evaluation by means of an image recognition method can be particularly effectively combined with the above-described continuous or stepped change to the focus position, since this makes it possible to also detect workpiece parts that have sunk below the surface of the scrap part.

DESCRIPTION OF DRAWINGS

Further advantages of the invention will become apparent from the description and the drawings. The aforementioned features and those yet to be stated can likewise each be used either in isolation or together in any combinations. The embodiments shown and described should not be taken to be an exhaustive list, but rather are intended as examples for outlining the invention.

In the drawings.

DETAILED DESCRIPTION

Figure 1:
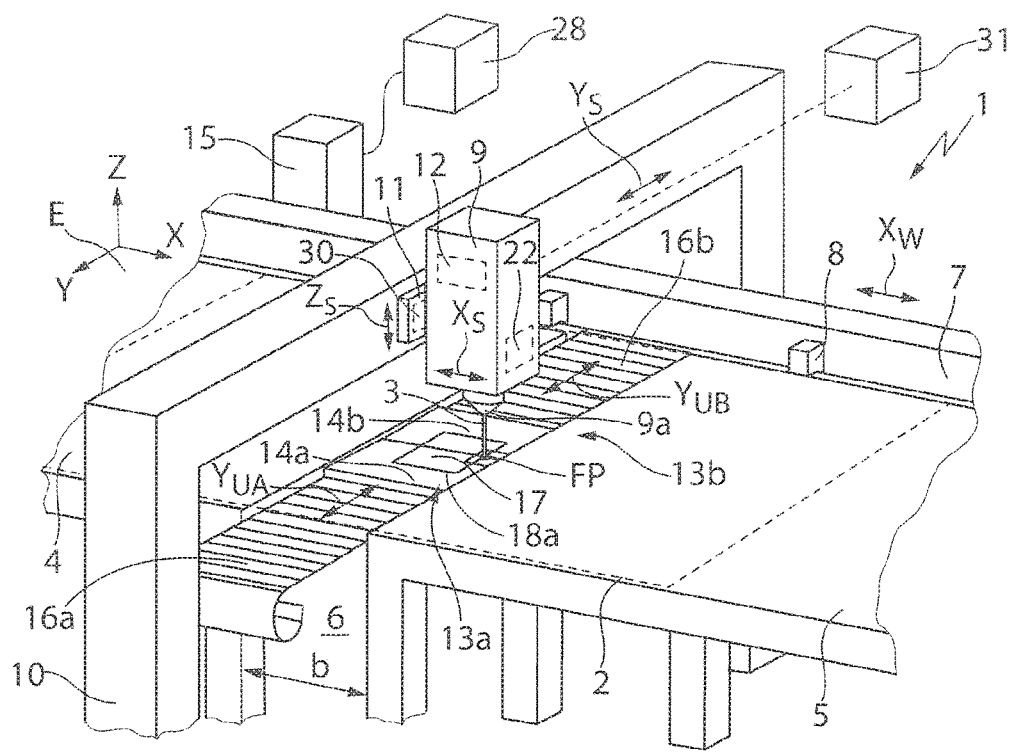
FIG. 1 is a schematic view of an embodiment of a workpiece cutting machine in the form of a laser machining machine.

In the following description of the drawings, identical reference numerals are used for the same components or those having the same function.

FIG. 1 shows an example design of a machine 1 for laser-machining, more specifically laser-cutting, a plate-shaped workpiece 2 (shown in dashed lines) by means of a laser beam 3. To cut the workpiece 2, another type of thermal machining beam can also be used instead of a laser beam 3. During the machining, the workpiece 2 rests on two workpiece bearing surfaces 4, 5, which in the example shown form the top faces of two workpiece tables and define a bearing plane E (X-Y plane of an XYZ coordinate system) for bearing the workpiece 2.

By means of a conventional movement and retaining device 7, comprising a drive and clamping devices 8 in the form of clamping claws for holding the workpiece 2 in place, the workpiece 2 can be shifted on the workpiece bearing surfaces 4, 5 in a first movement direction X (hereinafter: X-direction) in a controlled manner, and can be moved to a predefined workpiece position X.

Between the two workpiece bearing surfaces 4, 5, a gap 6 is formed, which extends in a second direction (hereinafter: Y-direction) over the entire travel path of a machining head, in the form of a laser cutting head 9, which directs and focuses the laser beam 3 at the workpiece 2. The laser cutting head 9 can be moved within the gap 6 in the Y-direction by means of a driven carriage 11 that acts as a movement device and is guided on a stationary gantry 10. In the example shown, the laser cutting head 9 can also be moved in the X-direction within the gap 6 in a controlled manner, and can be moved in the X-direction in a controlled manner by means of an additional movement device 12 attached to the carriage 11, for example in the form of a linear drive. By means of the movement devices 11, 12 built upon one another, the laser cutting head 9 can be positioned at a desired cutting head position $X_s$, $X_y$ within the gap 6 in both the X-direction and the Y-direction. Within the gap 6, two support carriages 13a, 13b are arranged, which each extend over the entire width b of the gap 6 and can be moved separately from one another in a controlled manner in the Y-direction within the gap 6.

In the example shown, the laser cutting head 9 can additionally be moved in a third movement direction Z (direction of gravity, hereinafter: Z-direction) by means of an additional movement device 13 built upon on the first movement device in the form of the carriage 11, so as to adjust the distance between a machining nozzle 9a of the laser cutting head 9 and the surface of the workpiece 2 or in order to position the laser cutting head 9 at a desired cutting head position $Z_s$ or at a desired distance in the Z-direction relative to the workpiece bearing plane E.

Within the gap 6, the support carriages 13a, 13b can each be moved in the Y-direction to a desired position $Y_{UA}$, $Y_{UB}$ in order to support the workpiece 2 here, or more specifically to support workpiece parts 17 to be cut free from the workpiece 2 or cut from the workpiece during the machining, by means of a bearing surface 14a, 14b fitted to the respective support carriages 13a, 13b. In the case shown, the bearing surface 14a, 14b of each support carriage 13a, 13b terminates flush with the workpiece bearing surfaces 4, 5 in the Z-direction, i.e. the bearing surfaces 14a, 14b are located in the bearing plane E for the workpiece 2.

To control the cutting, the machine 1 comprises a control device 15, which is used to coordinate the movements of the workpiece 2, the laser cutting head 9 and the support carriages 13a, 13b in order to adjust a desired workpiece position $X_w$, a desired cutting head position $X_s$, $Y_s$, $Z_s$, and a desired position $Y_{UA}$, $Y_{UB}$ of the support carriages 13a, 13b to allow a predefined cutting contour 18a to be cut and the workpiece to be supported in the region of the gap 6 as required. The first support carriage 13a can be moved in synchronisation with or independently from the second support carriage 13b. The control device 15 is also used to control a beam source 31 in the form of a laser source.

In the example shown in FIG. 1, one cover element 16a, 16b each is attached to the outer edges of the bearing surfaces 14a, 14b that extend in the X-direction and face away from each other, so as to cover the gap 6 outside the cutting region formed between the support carriages 13a, 13b. The cover elements 16a, 16b extend over the entire width b of the gap 6 and are moved in the Y-direction together with the movement of the support carriages 13a, 13b.

When a workpiece part 17 is cut free from the workpiece 2, more specifically from a scrap part of the workpiece 2 in the form of a scrap skeleton 19, the final connection between the workpiece part 17 and the scrap skeleton 19 is separated at a cut-free position FP. For this purpose, the two support carriages 13a, 13b are brought closer together such that only a very small distance or no distance at all remains therebetween in the Y-direction.

Figure 2:
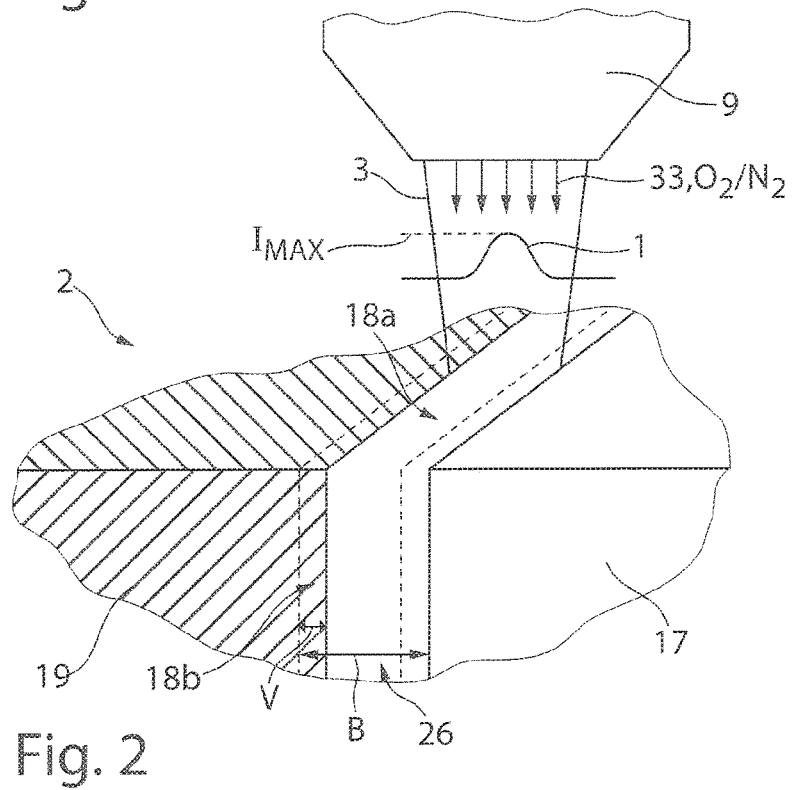
FIG. 2 is a schematic view of a cutting gap formed in the workpiece during the cutting.

FIG. 2 is a sectional view of a detail of the workpiece 2 from FIG. 1, in which a cutting gap 26 having a cutting gap width B is shown formed along the predefined cutting contour 18a in the workpiece 2. The cutting gap width B of the cutting gap 26 is defined by process parameters such as cutting-gas pressure, advance rate, laser power, etc. If the cutting shown in FIG. 1 proceeds correctly, the workpiece part 17 is fully separated from the scrap part 19 at the cut-free position FP along the predefined cutting contour 18a. The workpiece part 17 is then removed from the workpiece plane E, for example by moving the two support carriages 13a, 13b in the opposite direction within the gap 6, such that the workpiece part 17 is no longer supported and falls down into the gap 6, where the workpiece part 17 can be discharged from the machine 1 by means of devices not described in more detail.

Figure 3:
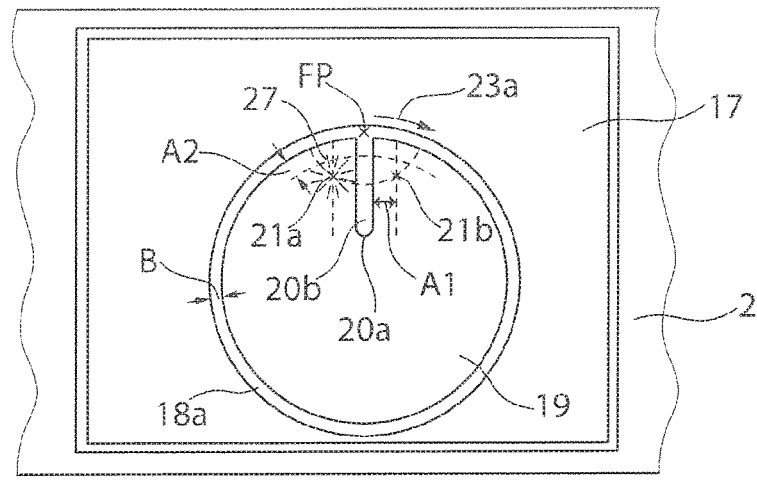
FIG. 3 is an illustration of a predefined cutting contour formed in the workpiece during cutting for separating a scrap part from a workpiece part.

To check whether the workpiece part 17 has actually been separated from the scrap part 19 during the cutting, a check or checking step is carried out, which will be described in more detail below on the basis of FIG. 3. FIG. 3 is a plan view of the workpiece 2 comprising a workpiece part 17 that has been cut away from the (scrap) workpiece 2 and from which, unlike as shown in FIG. 1, a circular scrap part 19 is cut out, for example to form an opening in the workpiece part 17 for fastening a screw or the like. In this example, the cutting contour 18a is circular, but it goes without saying that the geometry of the cutting contour 18a can in principle be any geometry. FIG. 3 also shows a piercing point 20a and a linear starting contour 20b, which allow the laser beam 3 to cut-in and start operating before it separates the scrap part 19 from the workpiece part 17 along the predefined cutting contour 18a. In FIG. 3, the machining direction 23a of the predefined cutting contour 18a proceeds clockwise, by way of example.

To check whether the scrap part 19 has been fully separated from the workpiece part 17 and thus has fallen down out of the workpiece plane E, the laser cutting head 9 is positioned, by means of the two movement devices 11, 12, and/or the workpiece 2 is positioned, by means of the movement and retaining device 7, in such a way that the laser beam 3 used for the machining is oriented substantially perpendicularly to the surface of the workpiece 2 and irradiates the scrap part 19 at a check position, FIG. 3 showing two possible check positions 21a, 21b by way of example. If an incompletely separated part, for example the scrap part 19 shown in FIG. 3, is located at the check position 21a, 21b, the laser beam 3 interacts with the scrap part 19, thereby generating radiation 27, which is indicated by way of example in FIG. 3 for the first check position 21a.

The two check positions 21a, 21b shown in FIG. 3 are spaced apart from the starting contour 20b by a distance A1 that corresponds to at least the cutting gap width B. The check positions 21a, 21b are also separated from the predefined cutting contour 18a by a distance A2 of at least 1 mm that corresponds to at least the cutting gap width B so as to prevent falsification of the measurement result due to a part of the laser beam 3 is irradiating the cutting gap 26 or the starting contour 20b. For the checking step to be carried out quickly, it is advantageous for each check position 21a, 21b to be separated from cut-free position FP by not too great an amount. If the laser beam 3 influences the material of the workpiece 2, the two check positions 21a, 21b should also be arranged at a distance from one another that corresponds at least to the cutting gap width B. If the laser beam 3 has a pulse action radius in which said beam also influences the material of the workpiece 2 outside the beam diameter, e.g. by material warping, the pulse action radius should be taken into account when determining the respective distances A1, A2, typically by enlarging each distance A1, A2 by the pulse action radius.

As set out in document DE 10 2011 004 117 A1 cited at the outset, the radiation 27 produced during interaction with the laser beam 3, which may be the process luminescence, thermal radiation due to the workpiece 2 heating up and/or reflected laser radiation, is recorded by means of a detector 22 (see FIG. 1), for example in the form of a photodiode. If the scrap part 19 in FIG. 3 or the workpiece part 17 in FIG. 1 has been fully cut away, the detector 22 does not detect any radiation intensity, or only detects a slight radiation intensity, of the radiation 27 generated during the interaction. On the basis of the detected radiation 27, an evaluation device 28 (cf. FIG. 1) checks whether the part 17, 19 has fallen down out of the workpiece plane E. For the check, the intensity of the detected radiation 27 can be compared with an intensity threshold value, for example. If the intensity of the detected radiation 27 is below the intensity threshold value, it is assumed that the part 17, 19 has fallen down out of the workpiece plane E, meaning that there is practically no interaction between the laser beam 3 and the part 17, 19 at the check position 21a, 21b.

Figure 4A:
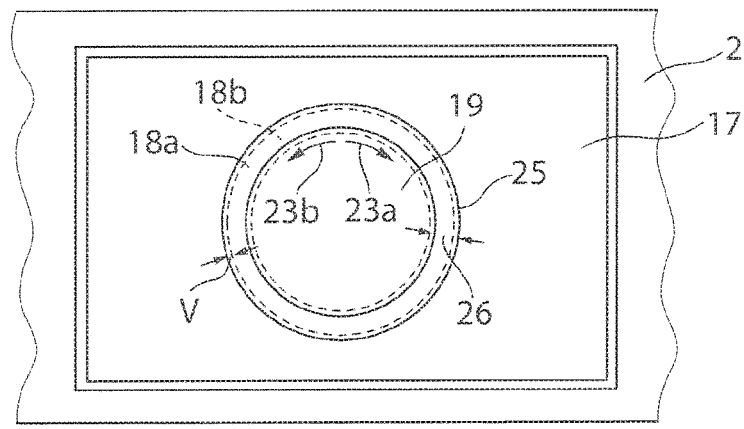
FIGS. 4A and 4B are schematic views of the predefined cutting contour from FIG. 3 and an additional cutting contour offset from the predefined cutting contour.
Figure 4B:
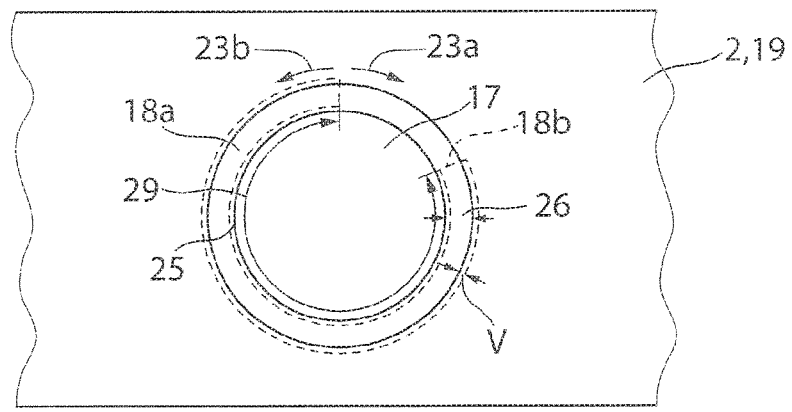

If it is found during the check that the workpiece part 17 has not been fully separated from the scrap part 19, re-cutting can be carried out immediately, as will be described in more detail below. Optionally, before the re-cutting, a check as to whether the workpiece part 17 has been fully separated from the scrap part 19 can be carried out again, i.e. the checking step can be repeated in the above-described manner, the check position generally being changed in the process. In this case, the re-cutting is carried out only if the two checking steps show that the workpiece part 17 has not been fully separated from the scrap part 19. As can be seen in FIGS. 4A and 4B and in FIG. 2, the re-cutting is carried out along an additional cutting contour 18b laterally offset from the predefined cutting contour 18a, and specifically offset towards the scrap part 19 by a constant amount V in each case in the examples shown. The examples shown in FIG. 4A and FIG. 4B differ from each other in that the scrap part 19 is circular in FIG. 4A, as in FIG. 3, whereas the useful part 17 is circular in FIG. 4B and is cut out of the scrap part 19, which in this case forms the scrap skeleton of the workpiece 2. As in the example shown in FIG. 3, the piercing point 20a and the starting contour 20b are also formed in the scrap part 19 in the example shown in FIG. 4B. In the example shown in FIG. 4B, the check position(s) 21a, 21b is/are also selected to be within the closed cutting contour 18a, i.e. within the circular useful part 17.

In the example shown in FIG. 4A, the additional cutting contour 18b is offset radially inwards towards the scrap part 19, whereas in the example shown in FIG. 4B the additional cutting contour 18b is offset radially outwards towards the scrap skeleton 19. The amount V of the offset of the additional cutting contour 18b is selected such that the machining beam 3 that impinges on the workpiece 2 to cut the additional cutting contour 18b does not strike the edge 25 of the workpiece part 17 (useful part), or only does so at the other edge of the distribution of the intensity I shown in FIG. 2 (Gaussian profile), such that the edge 25 of the workpiece part 17 is not impaired by the laser beam 3 during the re-cutting. In this case, the amount V of the lateral offset can be selected such that the laser beam 3 impinges on the edge 25 of the workpiece part along the additional cutting contour 18b during the cutting at an intensity I that is less than 50%, preferably less than 30%, in particular less than 20%, of the maximum intensity IMAX (cf. FIG. 2) of the beam profile of the laser beam 3; which extends radially symmetrically to the beam axis of the laser beam 3 indicated in FIG. 2. The amount V of the lateral offset can in particular be more than approximately 2% or more than 5% of the cutting gap width B of the predefined cutting contour 18a.

In addition, the amount V of the offset is typically selected such as to be smaller than the cutting gap width B of the cutting gap 26 along the predefined cutting contour 18a. It goes without saying that, unlike as shown in FIGS. 4A and 4B, the amount of the offset V is not necessarily constant, but rather can vary along the additional cutting contour 18b. As indicated in FIGS. 4A and 4B, the additional cutting contour 18b can be traced in the opposite machining direction 23b to the predefined cutting contour 18a; however, it is also possible for the machining direction of the predefined cutting contour 18a and of the additional cutting contour 18b to match, such that the two cutting contours 18a, 18b are cut in a clockwise manner. Additionally, it is not strictly necessary for the additional cutting contour 18b to extend over the entire length of the predefined cutting contour 18a; instead, the additional cutting contour 18b can extend over just a portion 29 of the predefined cutting contour 18a, as shown in FIG. 4B.

As can be seen in FIG. 2, during the cutting along the predefined cutting contour 18a, a cutting-gas beam 33 is used, which exits through the machining nozzle 9a of the laser cutting head 9 in the direction of the workpiece 2. In the example shown, the machining process is a flame-cutting process, i.e. the cutting-gas beam 33 consists of a reactive gas or the cutting-gas beam 33 contains a reactive gas (oxygen $O_2$ in the example shown). The cutting-gas beam 33 is also used for the re-cutting along the additional, laterally offset cutting contour 18b, although in this case an inert cutting gas in the form of nitrogen $N_2$ is used. The use of an inert cutting gas for the re-cutting along the additional cutting contour 18b has proven advantageous since, on one hand, a higher gas pressure can be used than in the case of a reactive gas, and on the other hand, using the inert cutting gas $N_2$ reduces the risk of a thermal reaction with the workpiece material.

Instead of re-cutting the workpiece 2 along the laterally offset cutting contour 18b by means of the machining beam 3, the predefined cutting contour 18a or optionally a laterally offset additional contour 18b, the course of which corresponds to the above-described additional cutting contour 18b, is retraced using the cutting-gas beam 33, without activating the machining beam 2 in the process. When retracing the predefined cutting contour 18a or the additional contour 18b, the cutting gas exerts a gas pressure on the workpiece part 17 to push said part down out of the bearing plane E and discharge it downwards. When retracing each contour 18a, 18b using the cutting-gas beam 33, only workpiece parts 17 that are slightly stuck to the scrap part 19 can typically be made to fall, i.e. the effectiveness of the re-cutting using the machining beam 3 is greater than the effectiveness of retracing the cutting contour 18a or the additional contour 18b by means of the cutting-gas beam 33. However, using the cutting-gas beam 33 is quality-neutral, i.e. the cut edges of the scrap part 19 or the workpiece part 17 are not influenced, in particular are not impaired.

After re-cutting along the additional cutting contour 18b or after retracing the predefined cutting contour 18a or the laterally offset additional contour 18b using the cutting-gas beam 33, an additional check as to whether the workpiece part 17 has been fully separated from the scrap part 19 can be carried out. The new check can be carried out in the above-described manner, but the check, and optionally the new check, can also be carried out using a different sensor system, e.g. in the form of a photoelectric sensor that is arranged below the workpiece plane E and detects whether the part 17, 19 has fallen. If the new check shows that the part 17, 19 has not been fully cut free, re-cutting can be carried out, followed by an additional checking step. It goes without saying a stop criterion should be set to prevent an infinite loop, such that the machine 1 pauses after a pre-defined number of repeats of the cutting and checking.

Figure 5:
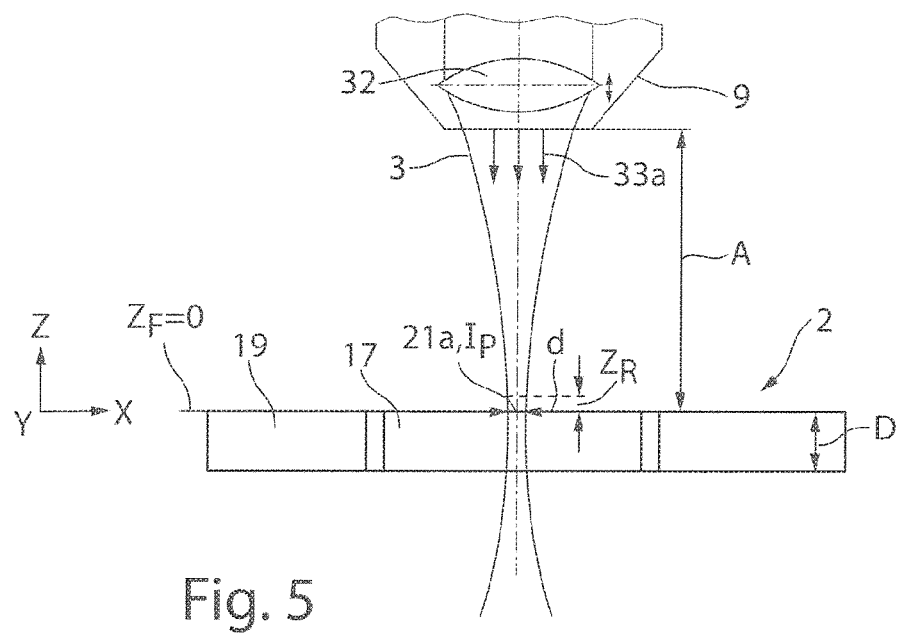
FIG. 5 is a schematic view of a beam profile of a laser beam irradiating the workpiece at a check position.

FIG. 5 shows the beam profile of the laser beam 3 focused at the workpiece 2 by a focusing device 32 (focusing lens) arranged in the machining head 9. In the example shown in FIG. 5, the position $Z_s$ of the machining head 9 in the Z-direction, and thus the distance A between the machining head 9 and the workpiece 2, is selected such that the focus position $Z_F$ is positioned precisely on the top face of the workpiece 2; in the example shown, this (arbitrarily) coincides with the coordinate origin of the Z-axis ($Z_F$=0). At the focus position $Z_F$, the laser beam 3 has its beam waist or its minimum beam diameter d, which is approximately d=150 μm in the example shown. For the radius R of the laser beam 3 in the Z-direction in the area surrounding the focus position $Z_F$, the following, applies as a good approximation:

$$R(Z) = d/2 \sqrt{1 + \left(\frac{Z}{Z_R}\right)^2},$$

where $Z_R$ denotes the Rayleigh length of the laser beam 3, which is dependent, inter alia, on the wavelength of the laser beam 3 and which is approximately 1.0 mm in the example shown. In the example shown, the workpiece 2 is made of steel, for example structural steel or high-grade steel. If a thickness D of the workpiece 2 is assumed to be D=6 mm, for example, the cross-sectional area of the laser beam 3 on the underside of the workpiece 2 is greater than the cross-sectional area of the laser beam 3 on the top face, i.e. at the focus position $Z_F$ in the example shown, by a factor of 37. If the workpiece part 16 that has not been fully cut free has sunk to a level close to the underside of the workpiece 2, the cross-sectional area of the laser beam 3 is increased by this factor and the intensity $I_P$ of the laser beam impinging on the workpiece part 17 is reduced accordingly by the factor 1/37.

Therefore, if the laser beam 3 irradiates the workpiece 2 at a relatively low power P, there is the risk that a workpiece part 17 that has sunk down but remains connected to the scrap part 19 will not be detected due to the interaction between the laser beam 3 and the workpiece part 17 being too low, and therefore that collisions with the sunken workpiece part 17 may occur as the process continues. However, if the laser beam 3 irradiates the workpiece 2 at a relatively high power P, a crater may be burnt into a workpiece part 17 located at the height of the top face of the workpiece 2; this is generally accompanied by very high levels of sparking. The sparks can soil the machine, for example by generating spatter marks on a protective glass provided on the machining head 9.

If the workpiece 2 is relatively thin, the workpiece 2 may additionally be pierced by the laser beam 3. If the workpiece 2 or workpiece part 17 is pierced, no valid check can be carried out again following a re-cutting, at least at the same check position 21a, since a check of this kind may no longer lead to any interaction with the material of the workpiece part 17, even if said part remains connected to the scrap part 19. In this case too, therefore, there is the risk of not detecting a workpiece part 17 that remains connected to the scrap part 19, which may lead to undesired collisions as the process continues.

Therefore, if a constant power P of the laser beam 3 is used for the check, said power should be so high as to still detect a workpiece part that has dropped down close to the underside of the workpiece 2, and the power P should also not be too great as to burn a crater into a workpiece part 17 located on the top face of the workpiece 2. If the workpiece part 2 is relatively thick, these conditions can generally not be satisfied using just one and the same power P of the laser beam 3.

Figure 6:
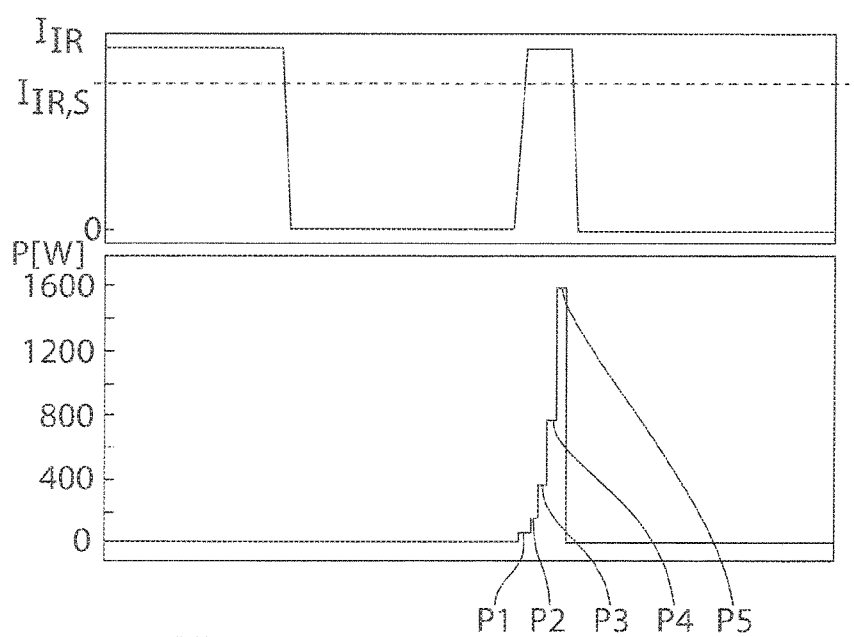
FIG. 6 is a schematic view of the temporal evolution of the power of the laser beam irradiating the check position, and of the temporal evolution of the intensity of IR radiation detected during the interaction of the irradiating laser beam with the workpiece.

To carry out a robust check despite the uncertainty regarding the position of the workpiece part 17 relative to the scrap part 19, the power P of the laser beam 3, which is pulsed in the example shown, is increased in steps during the check, as described below by way of example in FIG. 6. In FIG. 6, the power P, more specifically the average power, of the laser beam 3 irradiated in a pulsed manner is shown in five successive pulses P1 to P5. During the stepped increase in the example shown, the average power of the pulses P1 to P5 of the laser beam 3 is doubled each time, i.e. the first pulse P1 has an average power of 100 W, the second pulse P2 has an average power of 200 W, the third pulse P3 has an average power of 400 W, the fourth pulse P4 has an average power of 800 W and the fifth pulse P5 has an average power of 1600 W. The duration of each pulse P1 to P5 or of each step can be in the order of a few milliseconds, such that the pulse sequence shown as a whole in FIG. 6, and thus the entire check duration, is no more than for example approximately 20 ms in total.

As described above, while the laser beam 3 irradiates the workpiece 2, the intensity $I_{IR}$ of the detected radiation 27, e.g. in the infrared wavelength range, is detected by means of the detector 22. During the check, the intensity $I_{IR}$ of the detected radiation 27 is continuously compared with an intensity threshold value $I_{IR,S}$, as shown at the top in FIG. 6. If the detected intensity $I_{IR}$ of the radiation 27 is above the intensity threshold value $I_{IR,S}$, the laser beam 3 is stopped irradiating the workpiece 2, ideally in real time. To stop the irradiation practically in real time, the control device 15 acts on the beam source 31 via a real-time interface in order to switch off the laser beam 3.

By switching off the laser beam 3 in a timely manner, only the power P that is required for the check as to whether the workpiece part 17 has been fully separated from the scrap part 19 irradiates the workpiece 2 or workpiece part 17. In this way, no undesirable craters are formed, or the workpiece 2 is not pierced by the laser beam 3, as the case may be. In the example shown in FIG. 6, the intensity threshold value $I_{IR,S}$ has already been exceeded at the second pulse P2, and so the pulse sequence is terminated after the second pulse P2 and the third, fourth and fifth pulses P3, P4, P5 of the pulse sequence are no longer carried out.

Instead of increasing the power P of the laser beam 3 in steps as shown in FIG. 6, the power P of the laser beam can also be increased continuously. In particular, instead of a pulsed laser beam, a continuous laser beam 3 can also be used, the power of which is increased up to a maximum power in the manner of a ramp or the like during the check duration.

Instead of increasing the power P of the laser beam 3 during the check interval, as shown in FIG. 6, the intensity $I_P$ at the check position 21a can also be increased by altering, typically reducing, the distance A between the machining head 9 and the workpiece 2 continuously or in steps during irradiation with the laser beam 3. In this case, at the beginning of the checking time interval, the machining head 9 is positioned separated from the workpiece 2 by a distance A, for example, at which the focus position $Z_F$ is located above the top face of the workpiece 2. The distance A between the machining head 9 and the workpiece 2 is then reduced until the focus position $Z_F$ is located on the top face of the workpiece 2, at a position between the top face and the underside of the workpiece 2, or on the underside of the workpiece.

When the intensity $I_P$ of the laser beam 3 at the check position 21*a* is increased by shifting the focus position $Z_F$ of the laser beam 3, the irradiation of the check position 21*a* with the laser beam 3 is also stopped as soon as the intensity threshold value $I_{IR,S}$ is exceeded, so as to prevent the interaction with the workpiece 2 being too great, which may lead to crater formation or possibly to the workpiece 2 being pierced. In addition, by increasing the power P of the laser beam 3 or by reducing the focus diameter on the workpiece 2 during the checking process, it is possible to increase the robustness against variations in the texture of the material surface of the workpiece 2 and against the focus position being displaced relative to the workpiece 2. The method described here, in which the intensity $I_P$ at the check position 21*a* is increased during the check, can be advantageously combined with the above-described method in which the workpiece 2 is re-cut along an additional cutting contour 18*b* laterally offset from the predefined cutting contour 18*a*. Optionally, however, this method can also be carried out without a lateral offset 18*a* being produced during the re-cutting.

Regardless of whether or not the intensity $I_P$ at the check position 21*a* is increased during the check, the distance A between the laser cutting head 9 and the workpiece 2 can be increased during the re-cutting so as to enhance the robustness or process reliability of the cutting process. This has proven advantageous in particular for cutting processes that use a bypass flow nozzle, in which the distance A between the laser cutting head 9 or nozzle 9*a* and the workpiece 2 is very low and may be just 0.4 mm, for example. For the re-cutting, the distance A can be increased to 3 mm, for example.

To keep the focus position $Z_F$ constant relative to the workpiece 2 despite the increased distance A, the focus position $Z_F$ is shifted towards the workpiece 2 when the distance A is increased. For this purpose, the focusing device in the form of the focusing lens 32 in the laser cutting head 9 can be moved, for example, as indicated by a double arrow in FIG. 5. This ensures that the re-cutting is carried out substantially at the same cutting gap width B at which the cutting is also carried out.

Regardless of whether or not the intensity $I_P$ at the check position 21*a* is increased during the check, if it is detected during the check that the workpiece part 17 has not been fully separated from the scrap part 19, instead of the re-cutting an attempt can be made to discharge the workpiece part 17 from the bearing plane E by applying a gas pulse 33*a* (cf. FIG. 5) to the check position 21*a*. The gas pulse 33*a* typically has a high gas pressure, for example approximately 15 bar. For this purpose, an inert gas, e.g. nitrogen, is generally used as the (cutting) gas. The duration of the gas pulse 33*a* can be in the order of one or possibly several seconds. As with the above-described case where the cutting contour 18*a* or the additional cutting contour 18*b* is retraced using the cutting-gas beam 33, applying the gas pulse 33*a* is quality-neutral, i.e. it has no effect on the quality of the cut edges. The effectiveness of applying the gas pulse 33*a* to discharge the workpiece part 17 from the bearing plane E is, however, lower than re-cutting using the machining beam 3. Therefore, an attempt can first be made to discharge the workpiece part 17 by applying the gas beam 33*a*. If it is found during a new check that the workpiece part 17 is still in the bearing plane E, re-cutting can be carried out.

It goes without saying that while the above-described methods for checking the cutting have been described in relation to a laser cutting machine 1, they can also be carried out on other machine tools, for example on machines in which a punch function is combined with a laser cutting function.

What is claimed is:

1. A method of cutting a workpiece, the method comprising:
cutting the workpiece along a predefined cutting contour to separate a workpiece part from a scrap part; and
determining that the workpiece part has not been fully separated from the scrap part during the cutting;
wherein determining that the workpiece part has not been fully separated from the scrap part comprises:
irradiating the workpiece with a machining beam at a check position within the predefined cutting contour;
detecting radiation generated by interaction between the machining beam and the workpiece; and
evaluating the detected radiation to check that the workpiece part has been fully separated from the scrap part during the cutting;
wherein irradiating the workpiece with the machining beam comprises increasing the intensity of the machining beam at the check position and stopping the irradiation with the machining beam as soon as it is determined that the workpiece part has not been fully separated from the scrap part during the cutting.

2. The method of claim 1, wherein irradiating the workpiece comprises increasing, in steps, a power of the machining beam during irradiation of the check position.

3. The method of claim 1, wherein irradiating the workpiece comprises irradiating the check position with the machining beam in a pulsed manner, and wherein increasing a power of the machining beam comprises increasing, in steps, a power of pulses of the machining beam.

4. The method of claim 3, wherein increasing the power of the pulses comprises at least doubling the power of the pulses each time during the stepped increase.

5. The method of claim 1, wherein increasing the intensity of the machining beam at the check position comprises shifting a focus position of the machining beam towards the workpiece.

6. The method of claim 1, wherein determining that the workpiece has not been fully separated from the scrap part comprises comparing the intensity of the detected radiation with an intensity threshold value, and wherein stopping the irradiation with the machining beam comprises stopping the irradiation as soon as the intensity threshold value is exceeded.

7. The method of claim 1, further comprising:
applying, upon determining that the workpiece part has not been fully separated from the scrap part, a gas pulse to the check position to discharge the workpiece part from a bearing plane.

8. The method of claim 1, wherein cutting the workpiece comprises flowing, onto the workpiece, a cutting-gas stream containing a first reactive cutting gas, and wherein re-cutting the workpiece comprises flowing, onto the workpiece, a cutting-gas stream containing a second cutting gas different from the first cutting gas.

9. The method of claim 1, wherein re-cutting the workpiece comprises increasing a distance between a machining head and the workpiece, and wherein increasing the distance comprises shifting, as the distance is increased, a focus position of the machining beam towards the workpiece in order to use the same focus position during the re-cutting as during the cutting.

10. The method of claim 1, further comprising, in response to determining that the workpiece part has not been fully separated from the scrap part, re-cutting the workpiece along an additional cutting contour laterally offset from the predefined cutting contour.

11. The method of claim 1, wherein the additional cutting contour is laterally offset towards the scrap part by an amount sufficiently large that a machining beam directed to the workpiece for cutting the workpiece along the additional cutting contour impinges on a circumferential edge of the workpiece part at an intensity that is less than 50% of a maximum intensity of the machining beam.

12. The method of claim 1, wherein the additional cutting contour is laterally offset from the predefined cutting contour by an amount of at least 2% of a cutting gap width of the predefined cutting contour.

13. The method of claim 1, wherein re-cutting the workpiece comprises tracing the laterally offset cutting contour in an opposite machining direction to the predefined cutting contour.

14. The method of claim 1, wherein re-cutting the workpiece comprises forming the laterally offset cutting contour such that the laterally offset cutting contour extends along a portion of the predefined cutting contour only.

15. The method of claim 1, further comprising:
retracing, by a cutting-gas jet, upon determining that the workpiece part has not been fully separated from the scrap part during the cutting, the predefined cutting contour or an additional contour laterally offset from the predefined cutting contour.

* * * * *